US009400541B2

(12) United States Patent
Zimmermann et al.

(10) Patent No.: US 9,400,541 B2
(45) Date of Patent: Jul. 26, 2016

(54) ANALYZING POWER CONSUMPTION IN MOBILE COMPUTING DEVICES

(71) Applicant: Microsoft Technology Licensing, LLC, Redmond, WA (US)

(72) Inventors: Thomas Michael Josef Zimmermann, Bellevue, WA (US); Christian Alma Bird, Seattle, WA (US); Nachiappan Nagappan, Redmond, WA (US); Syed Masum Emran, Bothell, WA (US); Thirumalesh Bhat, Sammamish, WA (US); Ashish Gupta, Delhi (IN)

(73) Assignee: Microsoft Technology Licensing,LLC, Redmond, WA (US)

( * ) Notice: Subject to any disclaimer, the term of this patent is extended or adjusted under 35 U.S.C. 154(b) by 0 days.

(21) Appl. No.: 14/598,665

(22) Filed: Jan. 16, 2015

(65) Prior Publication Data

US 2015/0126254 A1   May 7, 2015

Related U.S. Application Data

(63) Continuation of application No. 13/286,216, filed on Nov. 1, 2011, now Pat. No. 8,965,718.

(51) Int. Cl.
*G06F 1/32* (2006.01)
*H04W 52/02* (2009.01)
*G06F 3/06* (2006.01)

(52) U.S. Cl.
CPC ............ *G06F 1/3206* (2013.01); *G06F 1/3268* (2013.01); *G06F 3/0625* (2013.01); *H04W 52/0254* (2013.01); *H04W 52/0261* (2013.01); *H04W 52/0258* (2013.01); *Y02B 60/50* (2013.01)

(58) Field of Classification Search
CPC ... G06F 1/3268; G06F 3/0625; G06F 1/3206; H04W 52/0254; H04W 52/0258; H04W 52/0261
USPC ........... 702/57, 60, 61, 62, 63, 65, 75, 79, 89, 702/119, 176, 177, 179, 182, 188; 700/295; 703/16; 713/320, 340; 714/22; 716/109; 717/133, 151, 153; 726/24
See application file for complete search history.

(56) References Cited

U.S. PATENT DOCUMENTS 7,373,222 B1 * 5/2008 Wright et al. ................. 700/295
7,802,241 B2    9/2010 Roy et al.
(Continued)

OTHER PUBLICATIONS

Kim, et al., "Detecting Energy-Greedy Anomalies and Mobile Malware Variants", Retrieved at <<http://www.csce.uark.edu/~nilanb/teaching/papers/Kim.pdf>>, Jun. 17-20, 2008, pp. 239-252.
(Continued)

*Primary Examiner* — John H Le
(74) *Attorney, Agent, or Firm* — Alin Corie; Sandy Swain; Micky Minhas

(57) ABSTRACT

Techniques pertaining to analyzing power consumed by a processing unit in a mobile computing device caused by execution of certain modules are described herein. A power trace is generated that indicates an amount of power consumed by the processing unit over time, and the power trace is aligned with an execution log. Spikes are extracted from the power trace, and computing operations are performed over the spikes to acquire data pertaining to power consumed by the processing unit that are attributable to modules in the execution log.

20 Claims, 6 Drawing Sheets

(56) References Cited

U.S. PATENT DOCUMENTS

| | | | |
|---|---|---|---|
| 7,814,368 B2 | 10/2010 | Hogan et al. | |
| 7,877,621 B2 | 1/2011 | Jacoby et al. | |
| 8,089,368 B2* | 1/2012 | Hong et al. | 340/636.1 |
| 8,160,753 B2 | 4/2012 | Ferentz et al. | |
| 8,599,746 B2 | 12/2013 | Durazzo et al. | |
| 8,630,745 B2 | 1/2014 | Noda et al. | |
| 8,965,718 B2* | 2/2015 | Zimmermann et al. | 702/61 |
| 2008/0288123 A1* | 11/2008 | Krishnan et al. | 700/295 |
| 2009/0171646 A1 | 7/2009 | Silbermintz et al. | |
| 2010/0175053 A1 | 7/2010 | Jansseune | |
| 2010/0313270 A1 | 12/2010 | Kim et al. | |
| 2011/0154309 A1 | 6/2011 | Sazegari et al. | |
| 2013/0110423 A1 | 5/2013 | Zimmermann et al. | |

OTHER PUBLICATIONS

Raphael, "Android battery life: 10 ways to make your phone last longer", Retrieved at <<http://blogs.computerworld.com/16965/improve_android_battery_life>>, Retrieval Date: Oct. 28, 2011. pp. 1-5.

Cheng, et al., "Virus detection and alert for Smartphones", In MobiSys '07: Proceedings of the 5th International Conference on Mobile Systems, Applications, and Services. 2007, pp. 258-271.

Pathak, et al., "Fine-Grained Power Modeling for Smartphones Using System Call Tracing", In EuroSys '11: Proceedings of the Sixth European Conference on Computer Systems European Conference on Computer Systems. Apr. 2011, pp. 153-168.

Iqbal, et al., "Hang on a sec! Effects of Proactive Mediation of Phone Conversations while Driving", In CHI '11: ACM CHI Conference on Human Factors in Computing Systems. May 2011, pp. 463-472.

Balasubramanian, et al., "Energy Consumption in Mobile Phones: A Measurement Study and Implications for Network Applications", In Internet Measurement Conference. May 2009, pp. 280-293.

Ge, et al, "PowerPack: Energy Profiling and Analysis of High-Performance Systems and Applications", IEEE Transactions on Parallel and Distributed Systems, 21, 5. May 2010. pp. 658-671.

Flinn, et al., "PowerScope: A Tool for Profiling the Energy Usage of Mobile Applications", In WMCSA '99: Workshop on Mobile Computing systems and Applications. 1999, pp. 2-10.

Shye, et al., "Into the Wild: Studying Real User Activity Patterns to Guide Power Optimizations for Mobile Architectures", In MICRO '09: 42st Annual IEEE/ACM International Symposium on Microarchitecture. Dec. 2009, pp. 168-178.

* cited by examiner

US 9,400,541 B2

ANALYZING POWER CONSUMPTION IN MOBILE COMPUTING DEVICES

RELATED APPLICATION

This application is a continuation of U.S. patent application Ser. No. 13/286,216, filed on Nov. 1, 2011, and entitled "ANALYZING POWER CONSUMPTION IN MOBILE COMPUTING DEVICES", the entirety of which is incorporated herein by reference.

BACKGROUND

Conventionally, in the field of software engineering, little (if any) attention has been paid to an amount of power that is consumed by a processing unit that is caused by software executed by the processing unit. This is because software has typically been designed for computing devices that have a constant and in diminishable supply of power (a personal computer that is plugged in to an electric outlet). With the explosive growth of smart phones, tablet computing devices, portable gaming consoles, and other mobile computing devices, power conservation is becoming increasingly important.

Software developers have begun to utilize certain techniques in an effort to conserve battery power of mobile computing devices. For instance, a developer may choose to employ TCP versus UDP, may configure an application to close certain sockets immediately upon the sockets no longer being necessary for execution of the application, or may configure requests to a remote computing device to be batched to utilize a wireless chipset as infrequently as possible. Furthermore, operating systems on mobile computing devices have been developed to conserve power by causing a backlight of a display of a mobile computing device to draw a diminished amount of power after a threshold amount of time of inactivity has passed.

With the growth of the market in tablets and smart phones, problems related to energy consumption of processing units in such devices are increasing. Both end users and developers are becoming increasingly sensitive to an amount of energy consumed by individual modules of a mobile computing device, such as a wireless chipset. Further, end users are becoming aware of which applications executed on mobile computing devices cause the battery life of the mobile computing devices to decrease rapidly. Several steps can be undertaken to reduce an amount of energy consumed by a portable computing device, including but not limited to turning off a wireless antenna, dimming the backlight of a display screen, amongst other techniques. Energy conservation, however, remains problematic.

SUMMARY

The following is a brief summary of subject matter that is described in greater detail herein. This summary is not intended to be limiting as to the scope of the claims.

Described herein are various technologies pertaining to visualizing, computing, and/or estimating energy consumption of a processing unit in a computing device that is attributable to a particular module or set of modules that are executed on the processing unit. The technologies described herein can be employed in connection with conventional computing devices, such as desktop computers, servers, or the like. The technologies described herein, however, are particularly beneficial in connection with analyzing power consumption attributable to certain modules that are to be executed by a processing unit on a mobile computing device, such as a smart phone, a tablet computing device, a laptop computing device, a portable gaming console, or the like.

In a testing environment, energy that is consumed by a processing unit over time when executing certain modules is monitored over a window of time, wherein the monitored amount of energy over the window of time is referred to herein as a power trace. For instance, a specialized hardware device can be operably connected to contacts of a battery retention cavity in a mobile computing device to monitor an amount of energy consumed by a processing unit of the mobile computing device over a time window. This monitored amount of energy can be sampled at a selected sampling rate, such as 5000 samples per second. Simultaneously, an execution log can be generated that identifies certain modules executed by the processing unit of the computing device over time. In an exemplary embodiment, a module may be a binary, such as an executable file or program. For instance, a module may be a dynamic link library that is accessed by the processing unit. In other exemplary embodiments, a module may be a method that is executed by the processing unit, an object (in accordance with object oriented programming) that is accessed by the processing unit, or the like.

The power trace may then be analyzed to locate a plurality of non-overlapping spikes, wherein a spike is defined as a window of time that has relatively high energy values therein. A window of time of a spike can range from a tenth of a second to several seconds. Further, spikes can be located in the power trace through an automated analysis (based on identified parameters) and/or manually identified. For instance, in an exemplary embodiment, the spikes can be automatically identified by searching for idle periods in the power trace (periods where the amount of power consumed by the processing unit is at a constant floor), and locating spikes between such idle periods.

The identified spikes and the execution log may then be aligned with respect to one another in time. Therefore, identities of modules that are executed by the processing unit during particular spikes can be ascertained, and such identities can be assigned to their respective spikes. Other data pertaining to monitored energy consumption of a spike can also be computed and assigned to the spike, such as average power consumption, peak power consumption, and the like.

Subsequent to the spikes in the power trace being identified and identities of modules executed during the respective spikes being ascertained, one or more computing operations can be undertaken over the plurality of spikes to analyze energy consumed by the processing unit when executing the modules. Such computing operations can be based at least in part upon machine learning techniques, supervised and unsupervised. Pursuant to an example, a linear regression algorithm can be executed over the plurality of spikes to estimate amounts of energy consumed by the processing unit that are attributable to modules that are active in the identified spikes. Graphical data may then be presented to an application developer that is utilizing the identified modules when coding, wherein the graphical data is indicative of amounts of energy consumed by such modules. As used herein, the term "graphical data" is intended to encompass any data that is visually displayed on a display screen of a computing device. For example, the graphical data may be a table that includes identities of modules and corresponding data that is indicative of amounts of energies consumed by the processing unit that are attributable to such modules, a graph, or the like.

In another exemplary embodiment, a decision tree learning algorithm can be executed over the plurality of spikes to generate a decision tree. The decision tree comprises a plurality of nodes, wherein each node has an energy value assigned thereto and at least one module corresponding thereto. A root node can represent the collection of modules included in all considered spikes and an average energy consumed by the processing unit for the considered spike. Branches exiting the root node indicate presence or absence of a module or subset of modules from the set of active modules in the spikes, such that a first child node beneath the root node corresponds to spikes that include the module or subset of modules and a second child node beneath the root node corresponds to spikes that do not include the module or subset of modules. Accordingly, the decision tree facilitates graphically depicting, to a developer, modules that are found to cause the processing unit to consume relatively large amounts of energy. If a particular module or set up modules is indicated as causing the processing unit to consume a relatively large amount of energy compared to other modules, then the developer can infer, for example, that a bug exists with respect to such module or set of modules.

In still yet another exemplary embodiment, a pattern recognition algorithm can be executed over the plurality of spikes to determine, for instance, whether co-occurrence of certain modules causes the processing unit to consume a relatively large amount of energy (incommensurate with amounts of energy consumed by the processor when the certain modules are not co-occurring). Graphical data can then be presented to the developer to indicate which modules, when co-occurring, cause the processing unit to consume a relatively large amount of energy.

In still yet another exemplary embodiment, one or more clustering algorithms can be executed over the spikes to cluster similar spikes. The clustering algorithm a can cluster spikes based at least in part upon the shape of the spikes (energy consumption shapes). Further, clustering can be undertaken based at least in part upon identities of modules existent in spikes. The result of the clustering is a plurality of clusters of spikes which can be graphically presented to the developer. The developer (or a computer-executable algorithm) may then review the clusters of spikes to identify spikes that are substantially different from other spikes (anomalies). For instance, a spike that cannot be assigned to a particular cluster may be identified as being an anomaly, and the developer of the application or operating system can further investigate the cause of the anomaly (e.g. a bug in code developed by the developer). In another example, a cluster may include a relatively small number of spikes compared to a number of spikes in other clusters. This indicates that the spikes assigned to the cluster with a small number of spikes are anomalous. Still further, other meta-information assigned to the clusters of spikes can be analyzed to locate anomalies. For instance, within a relatively large cluster homogeneity of spikes can be analyzed. For instance, if all spikes except for one spike include a particular module within a cluster, the spike that does not include such module can be an anomaly within the cluster.

In still yet another exemplary embodiment, a computing operation performed over the plurality of spikes can generate computer-implemented predictive models that are employed to predict amounts of power consumed by modules or sets of modules developed and/or employed by a developer. For instance, a linear regression model can be learned to predict which modules or sets of modules will cause a processing unit to consume a relatively large amount of energy. In another exemplary embodiment, spikes can be compared for a particular program or module across time. For instance, if the spike pattern differs between two separate time ranges (e.g., days or weeks), and especially if additional power is consumed in one or more spikes, it can be inferred that a "power bug" was introduced.

Other aspects will be appreciated upon reading and understanding the attached figures and description.

DETAILED DESCRIPTION

Figure 1:
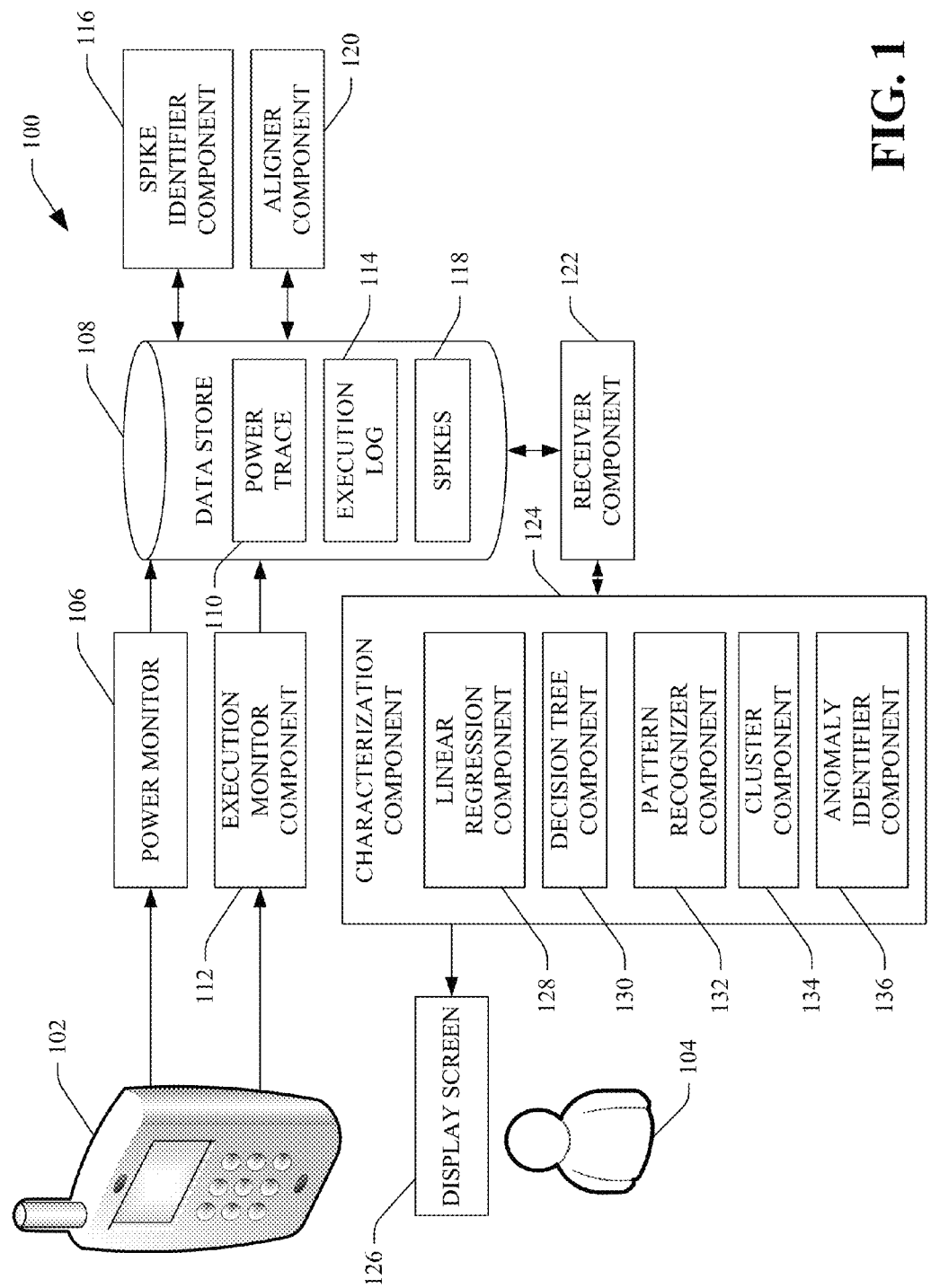
FIG. 1 is a functional block diagram of an exemplary system that facilitates characterizing estimating and or predicting an amount of energy consumed by a processing unit in a computing device that is attributable to a module executed by the processing unit.

Various technologies pertaining to analyzing power consumption of a computing device attributable to certain software modules will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates provision of graphical data pertaining to an amount of energy consumed by a processing unit that is attributable to one or more software modules executed by the processing unit is illustrated. As used herein, a module may be an executable file (a binary), a dynamic linked library, or other suitable portion of a program. In other embodiments, a module may be more granular, such as a method or object (in conformance with object-oriented programming). The system 100 comprises a computing device 102 that comprises a processing unit (not shown) that is configured to execute instructions that are retained in a memory of the computing device 102. The computing device 102 is shown as being a mobile computing device. It is to be understood, however, that the computing device 102 may be any suitable computing device. Pursuant to a particular example, the computing device 102 may be a smart phone or a tablet computing device. In other embodiments, the computing device 102 may be a portable gaming console, a laptop computing device, etc.

A developer 104 of at least one application or operating system that is desirably executed on computing devices with the hardware configuration of the computing device 102 may desirably be provided with graphical data pertaining to energy consumed by the processing unit when executing software modules utilized in the application or operating system. Specifically, the developer 104 may desirably receive graphical data that identifies which modules utilized in the development of the application or operating system cause the processing unit of the computing device 102 to consume the most amount of energy. In another example, the developer 104 may be desirably provided with graphical data pertaining to whether co-occurrence of specific modules increases or decreases energy consumed by the processing unit of the computing device 102 when executing such modules. Further, the developer 104 may desirably obtain graphical data pertaining to characteristic energy shape patterns corresponding to certain modules that are executed by the processing unit of the computing device 102. In yet another example, the developer 104 may desirably obtain graphical data that is indicative of existence of anomalies in a power trace.

The system 100 facilitates provision of such graphical data amongst other graphical data to the developer 104. The developer 104 may then utilize such information to modify an application or operating system developed by the developer 104, to correct bugs with respect to energy consumption caused by one or more modules utilized by the developer 104 when developing the application or operating system, or the like.

To facilitate provision of such graphical data to developer 104, the computing device 102 can be configured with applications and/or operating systems that are desirably subjected to testing. Real-world usage data with respect to applications can be collected, and testing can model real-world usage of the computing device 102. Further, testing can be conducted to cause idle periods to exist, thereby aiding in identifying when the processing unit of the computing device 102 is most active.

The system 100 comprises a power monitor component 106 that monitors an amount of electric power consumed by the processing unit of the computing device 102 over a particular window of time. In an exemplary embodiment, when the computing device 102 is tested for power consumption, a recent build of an application or operating system is loaded onto the computing device 102 (based upon operations that are desirably tested). A number of tests can be run repeatedly on the computing device 102 for some set period of time. In accordance with an example, the power monitor 106 can be specialized hardware that is placed in electrical connection with, for instance, battery contacts of the computing device 102. The power monitor 106 is then configured to monitor power draw of the computing device 102 at some set sampling rate (e.g. 5000 samples per second). It is to be understood, however, that the power monitor 106 may be internal to the computing device 102.

Figure 2:
FIG. 2 illustrates an exemplary power trace.

The system 100 further comprises a data store 108, wherein the data store 108 is in operable communication with the power monitor 106. The record of amount of electric power consumed by the computing device 102 over time is referred to herein as a power trace 110, which can be retained in the data store 108. Referring briefly to FIG. 2, an exemplary power trace 200 is shown, wherein the power trace 200 is amounts of energy sampled by the power monitor 106 over a window of time.

Returning to FIG. 1, the system 100 further comprises an execution monitor component 112 that is configured to output an execution log of software modules executed by the processing unit of the computing device 102 over the window of time that corresponds to the power trace 110. While shown as being external to the computing device 102, it is to be understood that in an exemplary embodiment the execution monitor component 112 may be internal to the computing device 102. A resulting execution log 114 can be retained in the data store 108. In an exemplary embodiment, a module monitored by the execution monitor component 112 may be a thread of execution corresponding to an application, and the execution monitor component 112 can record time for an active thread in the application or operating system at each context switch as well as whenever a thread is started or dies. Modules active at any given point in time are indicative of a type of operation occurring on the computing device 102. For instance, there may be active modules for Wi-Fi operations or HTML rendering; accordingly, the execution log 114 can include the sequence of context switches with accompanying time and lists of active modules.

Further, as mentioned above, the analysis may desirably be directed solely to power consumed by the processing unit of the computing device 102, and not electric power consumed by a screen of the computing device 102 or a graphical processing unit (GPU) of the computing device 102. There are generally two sources of power usage which are largely independent of the processing unit of the computing device 102. The first is the cellular chipset, which is responsible for maintaining contact with cellular towers as well as making and receiving calls, which runs on its own firmware. The second is the GPU, which provides hardware acceleration capabilities. Because the power monitor 106 may be configured to measure aggregate power usage on the device, the chipset and GPU may introduce a relatively small amount of noise to the analysis of power usage by the processing unit. This noise can be mitigated in at least three different ways. First, calls may not be made or received while recording power usage and code execution. While a cellular chipset may contact a nearest tower every few seconds, such operation is consistent both in terms of power draw and timing. Further, location of the computing device 102 is static during testing, such that distance to cell towers (and thus power used to make contact with the cell towers) can remain constant. This allows for removal of power spikes in the power trace that occur as a result of a cellular heartbeat. Second, although the code executing on the core of the GPU is not recorded, the content of the display of the computing device is generally indicative of operations being performed, and therefore code executing on the processing unit of the computing device 102. Therefore, power usage resulting from GPU activity should not introduce any bias. Moreover, power traces can be collected from relatively long sessions with different computing device usage scenarios, each executed a large number of times. Therefore, it can be expected that a large number of samples will provide a signal that is robust to any noise introduced by other sources of power used on the computing device 102.

The system 100 additionally comprises a spike identifier component 116 that is configured to identify spikes in the power trace 110 and store identified spikes 118 in the data store 108. As computing devices, including mobile computing devices, optimize for power consumption, the power trace 110 will include periods of time of relative inactivity (low power use) punctuated by relatively brief periods of time of high activity (high power use). These periods of high activity can be referred to as spikes, and can be automatically identified by the spike identifier component 116. It can be noted that within any identified spike, there may be fluctuations in power consumption. Duration of a spike identified by the spike identifier component 116 can range from, for instance, 1/10 of a second to several seconds. Any suitable algorithm can be employed by the spike identifier component 116 when automatically identifying the spikes 118 in the power trace 110. Furthermore, the developer 104 or other individual may manually identify the spikes 118 in the power trace 110.

An aligner component 120 can access the data store 108 and align the identified spikes 118 with the execution log 114 in time. In an example, the power monitor 106 can be an external hardware component that is configured to monitor electric power drawn by the processing unit of the computing device 102, while the execution monitor component 112 can be a computer-executable algorithm that is executing within the computing device 102. Therefore, a clock associated with the power monitor 106 may be out of synchronization with a clock utilized in the computing device 102 to generate the execution log 114. The aligner component 120 can align the spikes 118 with the execution log 114 by searching for certain indicators in the spikes and the execution log 114. For instance, if the computing device 102 is a mobile telephone, then as mentioned above the mobile telephone will periodically transmit signals to nearby cell towers. Spikes that correspond to the mobile telephone contacting cell towers are identified by locating a set of sample energies in the power trace 110 that occur at regular intervals, occur over the same or substantially similar amounts of time, and draw the same or substantially similar amounts of power. These identified spikes can be removed from the spikes 118, and the aligner component 120 can align the execution log 114 with the remaining spikes 118 based upon time intervals between spikes in the spikes 110 and context switches in the execution log 114. In an example, if there is a period of 3 minutes with no context switches or code execution in the execution log 114 and a period of 3 minutes of low power usage between a set of spikes, then these corresponding points in time can be used as anchors by the aligner component 120 to align the execution log 114 with the spikes 118. While the aligner component 120 has been described as automatically aligning the spikes 118 with the execution log 114, it is to be understood that the spikes 118 and the execution log 114 can be aligned manually, for example by the developer 104. Further, the aligner component 120 can align the execution log 114 with the power trace 110 prior to the spikes 118 being identified.

Subsequent to the spikes 118 in the power trace 110 being identified and aligned with the execution log 114, the spike identifier component 116 can assign other data to the spikes 118. This other data may include, for instance, for each respective spike, a unique identifier, a start time and end time for each spike, wherein the spikes are non-overlapping, a duration of each spike, a floor power (in mW) for each spike, an average power (in mW) for each spike, a peak power (in mW) for each spike, a total amount of electric power consumed by the processing unit during a spike for each spike (in mW hours), and identities of modules active in the execution log 114 during the time window of the spike. In other words, each spike in the spikes 118 will include sample amounts of electric power utilized by the processing unit of the computing device 102, wherein the computing device 102 has a particular hardware configuration and wherein the spike is confined to a particular window of time. Each spike further includes identities of modules that are active (executed by the processing unit in the computing device 102) within the defined window of time for the spike.

Figure 3:
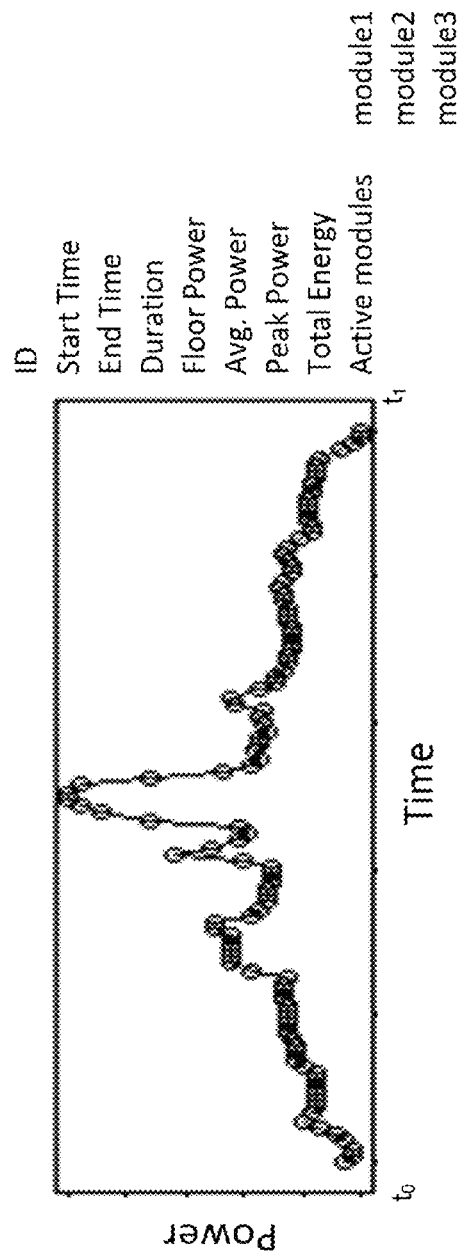
FIG. 3 illustrates an exemplary spike that is extracted from a power trace and assigned module identities.

With reference briefly to FIG. 3, an exemplary spike 300 is illustrated. The spike 300 is confined to a time window between times to and time ti. As shown, the spike 300 is assigned a spike ID, a start time, an end time, a duration, a power floor, an average power, a peak power, a total amount of electric power, and identities of modules active (executed by the processing unit) within the time window between times to and time ti. In the exemplary spike 300 shown in FIG. 3, module one, module two, and module three are the active modules during the spike 300. It is to be understood that a spike may include more or less data than what is shown as being included in the spike 300. For instance, a spike may only include identities of active modules and values of sample energy usage by the processing unit of the computing device 102.

While the spike 300 is illustrated as being a portion of a power trace over a time range, other scenarios are also contemplated. For instance, power consumption can be monitored with respect to other parameters/scenarios. In an example, a "scenario" may refer to actions of opening a file, writing into the file, and closing the file. A spike can represent power consumption over such scenario. For instance, such scenario (open file, write into file, close the file) can be undertaken for two separate mobile computing devices, and the power consumption during the scenario can be compared with respect to the two separate mobile computing devices.

Returning again to FIG. 1, the system 100 additionally comprises a receiver component 122 that is configured to receive the spikes 118 from the data store 108. A characterization component 124 is in communication with the receiver component 122, wherein the characterization component 124 performs at least one computing operation over the plurality of spikes 118 to provide the developer 104 with graphical data on a display screen 126 that is indicative of an amount of electric power consumed by the processing unit of the computing device 102 that is attributable to at least one of the modules executed by the processing unit during testing. For instance, the graphical data displayed on the display screen 126 by the characterization component 124 can be indicative of which modules executed by the processing unit of the computing device 102 consume the most electric power, whether co-occurrence of specific modules increases or decreases power consumption by the processing unit of the computing device 102, which energy shape patterns are characteristic of certain modules executed by the processing unit of the computing device 102, and/or whether there are any anomalies in the power trace 110. Examples of different types of graphical data that can be caused to be displayed on the display screen 126 to the developer 104 are set forth below.

In an exemplary embodiment, the characterization component 124 can comprise a linear regression component 128 that performs a linear regression analysis on the plurality of spikes 118 to generate the graphical data that is displayed on the display screen 126 to the developer 104. In this example, such graphical data can include, for each module identified in the spikes 118, data that is indicative of an amount of electric power consumed by the processing unit that is attributable to the respective modules. With more specificity, power consumption in the spikes 118 is not linked to individual modules in the spikes 118, but is instead link to a set of modules that are active during the window of time corresponding to the spikes. To isolate energy consumption attributable to an individual module, regression analysis can be employed by the linear regression component 128. In an example, input data provided to the linear regression component 128 can have the following form:

| Spike ID | Module 1 | Module 2 | Module 3 | ... | Module N | Avg. Power |
|---|---|---|---|---|---|---|
| ID 1 | 1 | 0 | 0 | ... | 0 | Power 1 |
| ID 2 | 0 | 0 | 0 | ... | 1 | Power 2 |
| ID 3 | 0 | 0 | 0 | ... | 1 | Power 3 |
| . | . | . | . | | . | . |
| . | . | . | . | | . | . |
| ID M | 0 | 1 | 1 | ... | 0 | Power M |

Accordingly, each spike has a unique spike identifier followed by flags to indicate the presence or absence of modules in the spike (0 for absence, 1 for presence) and average power consumption for the respective spike. In another embodiment, input data can include data that is representative of frequency of usage, such as time (s) that a module is employed, a number of times the module is employed, normalized data pertaining to a module, or the like.

An example pertaining to linear regression analysis is provided herein; it is to be understood, however, that other regression models can be employed to analyze spikes. With linear regression analysis, relationship between the average energy consumption y of a spike and the presence of individual modules (denoted by dummy variables $x_m$) can be modeled for a particular module m as follows:

$$y = \beta_0 + \beta_1 x_1 + \beta_2 x_2 + \ldots + \beta_M x_M.$$

Informally, if a module m is present ($x_M=1$), it contributes $\beta_M$ to the estimated energy consumption.

Table 1 below illustrates an example of a regression model:

TABLE 1

| Factor | Estimate $\beta_i$ |
|---|---|
| (Intercept) | 297.053 |
| Module 1 | 608.625 |
| Module 2 | 421.397 |
| Module 3 | 264.602 |
| Module 4 | 252.904 |
| Module 5 | 192.448 |
| Module 6 | 118.889 |
| Module 7 | −33.156 |
| Module 8 | −42.860 |
| Module 9 | −88.667 |
| Module 10 | −137.778 |
| Module 11 | −139.671 |
| Module 12 | −183.723 |
| Module 13 | −292.122 |
| Module 14 | −329.861 |

In this example, when Module 1 alone is present and all other modules (Modules 2-14) are absent, an estimated total power consumed by the processing unit is 297+608 (the estimated intercept plus power consumption of the processing unit attributable to Module 1). If both Module 1 and Module 2 are present, and all other modules are absent, then power estimated to be consumed by the processing unit is 297+608+ 421. If only Module 2 is present and all other modules are absent, then the power estimated to be consumed by the processing unit is 297+421 (and so forth). Accordingly, the coefficients illustrate that the modules Module 1 (estimated 608 mW) and Module 2 (estimated 421 mW) are associated with high power consumption in spikes. The modules that are associated with spikes with low average power consumption have negative coefficients. The estimated power consumption output by the linear regression component 128 can allow engineers to better understand which modules are likely correlated with high or low power consumption. Accordingly, the linear regression component 128 can present a table, such as the table shown in Table 1, to the developer 104 on the display screen 126. The developer 104 may then make design decisions for an application or operating system based at least in part upon the energy consumption data presented on the display screen 126. The utilization of linear regression set forth above is intended to be non-limiting, as other techniques, including decision trees, support vector machines, and the like can be employed to estimate power consumption attributable to certain modules.

In another exemplary embodiment, the characterization component 124 may comprise a decision tree component 130 that receives the plurality of spikes 118 and learns a decision tree based at least in part upon power values of spikes and modules active during the spikes. The decision tree computed by the decision tree component 130 includes nodes that are indicative of an amount of energy consumed by the processing unit attributable to at least one module identified in at least one of the spikes. The computed decision tree may then be caused to be graphically displayed to the developer 104 on the display screen 126.

Figure 4:
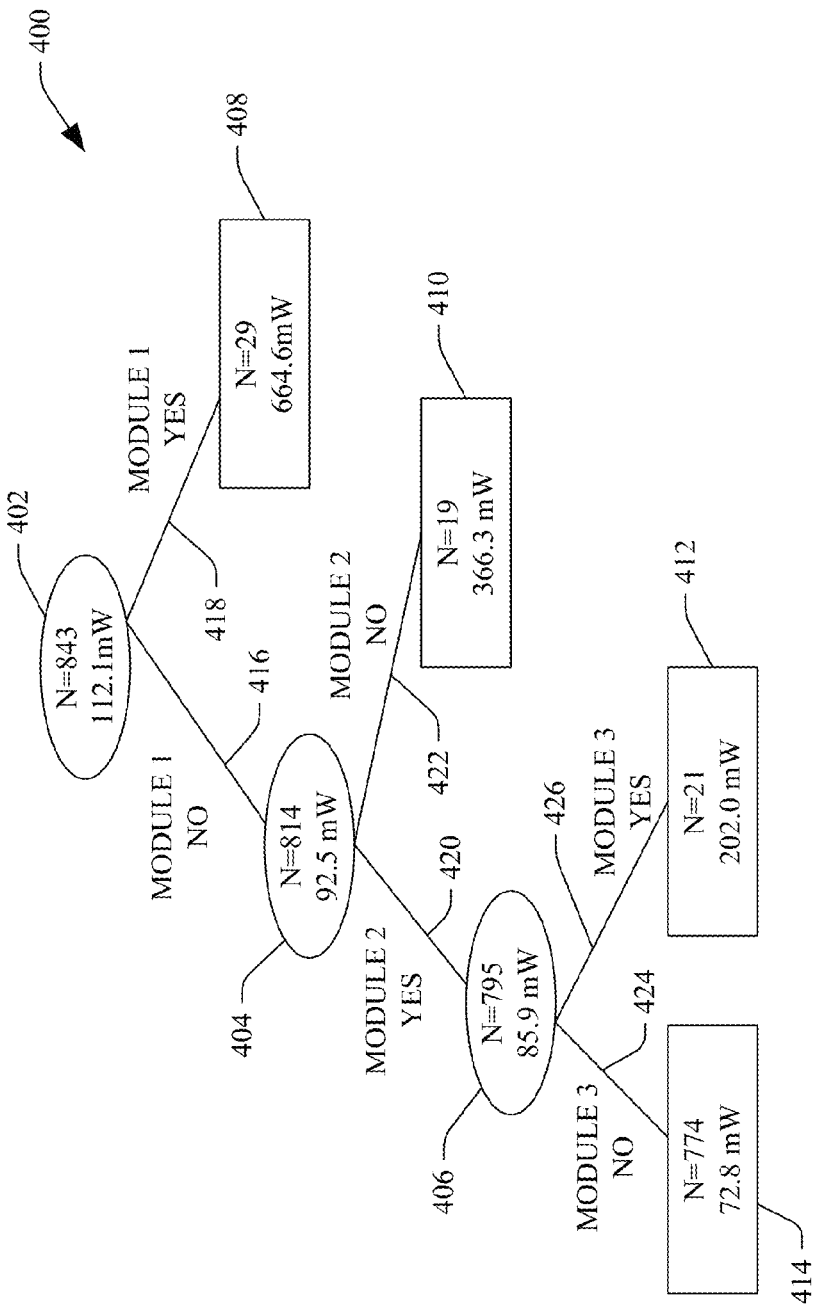
FIG. 4 is an exemplary decision tree that depicts information pertaining to an estimated amount of energy consumed by a processing unit that is attributable to a particular module or set of modules executed by the processing unit.

Referring briefly to FIG. 4, an exemplary decision tree 400 that can be computed by the decision tree component 130 is illustrated. The decision tree 400 models influence of modules on average power consumption of the processing unit evidenced in the spikes. In an example, inner nodes in the decision tree 400 computed by the decision tree component 130 can indicate presence/absence of certain modules, and each node can comprise the average energy consumption spikes that do and do not include specific modules as defined by the path to the root node. For instance, the decision tree 400 may include a root node 402, internal nodes 404 and 406, and leaf nodes 408, 410, 412, and 414. The decision tree 400 additionally comprises a plurality of branches 416-426, where a branch is indicates presence or absence of a module. Exemplary decision tree 400 is a decision tree that represents 843 spikes within a power trace. The root node 402 indicates the number of spikes considered in the power trace as well as an average energy consumption for all spikes (112.1 mW). This is shown in the root node 402 on the first level of the decision tree 400.

The tree is split based on presence of Module 1. For the 814 spikes that do not include Module 1, the average energy consumption is 92.5 mW (as shown in the inner node 404). For the 29 spikes that include Module 1, however, the average energy consumption increases six times to 664.6 mW. This indicates that Module 1 may cause the processing unit to consume a relatively large amount of electric power when executing Module 1 relative to executing other modules identified in the spikes. In the second level, the absence of Module 2 is shown to increase energy consumption by a factor of 4 as can be ascertained by comparing the power consumption shown in the inner node 406 with the power consumption shown in the leaf node 410 on the 3rd level. The presence of Module 3 increases energy consumption by a factor of 3 as shown by comparing the energy consumption assigned to the leaf node 412 with the energy consumption assigned to the leaf node 414. The decision tree component 130 can cause a regression tree such as the regression tree 400 depicted in FIG. 4 to be displayed on the display screen 126 to the developer 104.

Referring again to FIG. 1, it is to be understood that the linear regression component 128 and the decision tree component 130 employ supervised learning techniques in connection with generating the graphical data that is displayed on the display screen 126. The characterization component 124 may also be configured to utilize unsupervised learning techniques to provide graphical data to the developer 104 on the display screen 126. Specifically, in an exemplary embodiment, the characterization component 124 can include a pattern recognizer component 132 that analyzes the plurality of spikes and outputs data that indicates whether co-occurrence of certain modules causes the processing unit of the computing device 102 to consume an amount of energy that is not commensurate with the amount of energy consumed by the processing unit when such modules are not co-occurring. Pursuant to a particular example, the pattern recognizer component 132 may be or include a frequent pattern mining algorithm and/or a statistical significance testing algorithm. In an exemplary embodiment, the spikes 118 can be split into 2 groups by the pattern recognizer component 132: a first group that includes a top threshold percentage of spikes with the highest average power consumption (e.g., 10%); and a second group that contains the remaining spikes (e.g., 90%). For each pair p of modules, the frequency in the first group and the frequency in the second group is counted. The result is a contingency table, an example of which is set forth below:

TABLE 2

|  | Does contain p | Does not contain p |  |
|---|---|---|---|
| First Group | A | C | 10% |
| Second Group | B | D | 90% |

For each pair $p=(m_1, m_2)$, a likelihood that spikes which include p are part of the first group are computed:

$P(High|contains\ p) = A/(A+B)$.

Fisher exact value tests can then be employed to compare P(High|contains p) with the likelihood that spikes which do not include p are part of the first group, P(High|does not contain p)=C/(C+D), and the likelihoods that spikes which include the individual modules $m_1$ and $m_2$ are part of the first group, P(High contains $m_1$) and P(High|contains $m_2$) respectively. The pattern recognizer component 132 can output graphical data that identifies pairs of modules that cause the processing unit of the computing device 102 to consume an inordinate amount of power when such modules are co-occurring.

The characterization component 124, in another exemplary embodiment, may include a cluster component 134 that cluster spikes in the plurality of spikes 118 into a plurality of different clusters. The cluster component 134 may then cause graphical data to be displayed on the display screen 126 that is representative of different clusters in the plurality of clusters. The cluster component 134 can perform clustering utilizing any suitable clustering algorithm and may cluster spikes as a function of energy shape patterns of spikes, identities of modules in spikes, or other parameters. The clusters output by the cluster component 134 can provide the developer 104 with an indication of what the characteristic energy shape patterns are for modules or sets of modules.

With more particularity, the power trace 110 may include hundreds or even thousands of spikes which may all have relatively similar shapes. The cluster component 134 can cluster spikes based on shape, thereby allowing the developer 104 to identify characteristic shape patterns and reduce a number of spikes in the power trace 110 that need to be investigated by the developer 104. Thus, rather than reviewing all the spikes 118, the developer 104 can focus on a relatively small number of clusters (typically 10 to 20), each corresponding to a characteristic shape pattern with a list of associated spikes. Meta information may also be rolled up into a cluster by the cluster component 134 for each cluster of spikes, such as lengths of spikes in a cluster, modules active in spikes in the cluster, etc. The developer 104 can choose a variety of different input data for clustering. For instance, all spikes in a power trace can be clustered or a subset of the spikes in the power trace 110 may be clustered (e.g. spikes that include a specified module or set of modules).

In an exemplary embodiment, the cluster component 134 may include an algorithm that computes distance between two spikes. For instance, the algorithm can be the Kullback-Leibler divergence algorithm. In another exemplary embodiment, to reduce the computational cost of comparing all spikes, spikes can be selectively distributed across a particular number of buckets, and the average energy consumption can be calculated for each bucket. The Kullback-Leibler divergence may then be computed by the cluster component 134 across the buckets for each pair of spikes. The result of this computation is a distance matrix D, where a cell value $d_{xy}$ corresponds to the distance between spike x and spike y.

The cluster component 134, in an exemplary embodiment, may utilize a hierarchical clustering method. For instance, initially each spike can be assigned to its own cluster. At each stage, two most similar clusters can be joined iteratively until there is a single cluster. A result of such hierarchical clustering is a tree diagram of clusters referred to as a dendrogram that indicates the join order. The tree can then be cut into a certain number of clusters.

In still yet another exemplary embodiment, rather than treating the spikes 118 as time-series data, such spikes can be described with feature vectors that include features such as number and position of peaks in the spikes. In yet another example, dynamic time warping can be employed, wherein dynamic time warping is an algorithm that is frequently used in speech recognition for measuring similarity between two sequences which may vary in time or speed. Other alternatives for clustering are, for instance, K means and model-based approaches.

The graphical data pertaining to clusters presented to the developer 104 on the display screen 126 can allow the developer 104 to identify anomalous spikes in the power trace 110. Additionally or alternatively, the characterization component 124 can comprise an anomaly identifier component 136 that analyzes clusters output by the cluster component 134 and automatically identifies anomalous spikes. An exemplary mechanism to automatically identify anomalies in power traces it to search for extreme coefficients in regression models or for extreme splits. Another technique is to employ the clustering of spikes. An underlying assumption can be that spikes with similar shapes also share similar behavior. Given such assumption, various types of anomalies can be identified based on clustering approaches. For instance, clusters that have only a few spikes are candidates for being anomalies, where a cluster and all its spikes can be labeled as anomalous. In contrast, large clusters are likely not to be anomalous. Further, individual spikes that do not fit into any cluster can be candidates for being anomalies. In yet another example, within a large cluster homogeneity of spikes can be analyzed. For instance, if the cluster component 134 clusters based on shape of spikes, such that within a cluster shapes are expected to be similar, to locate anomalies within clusters additional meta-information can be compared, such as identities of modules in the spikes, average and peak power consumption of spikes, and duration of spikes. For instance, if all spikes in a cluster except for one spike include a particular module, such spike that does not include the module can be labeled as anomalous. Again, such analysis can be undertaken manually by the developer 104 or automatically by the anomaly identifier component 136.

The description of the system 100 has been described with respect to testing currently developed software; it is to be understood that portions of the system 100 may be utilized in connection with predictive analysis—that is, the power trace 110 and the execution log 114 have been described as being generated based upon frequent tests over the duration of a relatively long period of time (12 hours). In other words, the system 100 has been described as identifying modules in developed software and/or operating systems that may cause a processing unit of a computing device to consume large amounts of electrical power. It is to be understood, however, that such information can be employed in a predictive setting such that the developer 104 can submit code or a portion of code to a predictive component that outputs predictions based upon the linear regression model described above, so long as the linear regression model has contemplated modules that are in the code set forth by the developer 104.

Figure 5:
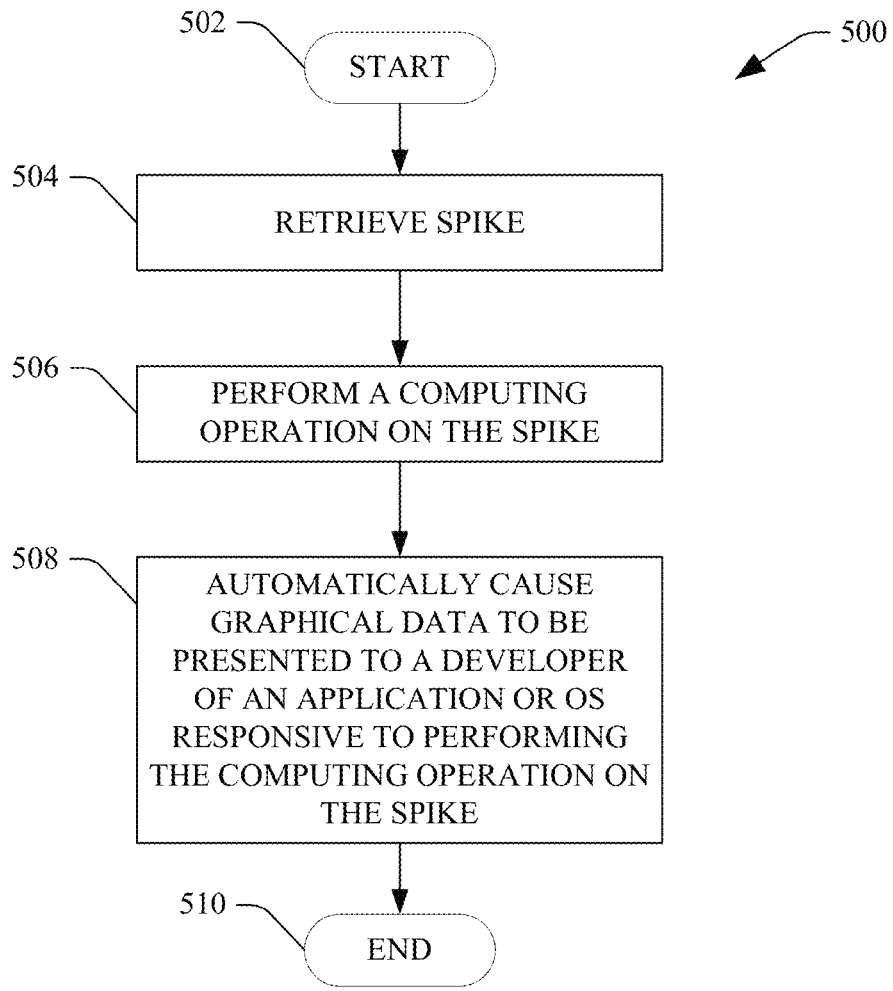
FIG. 5 is a flow diagram that illustrates an exemplary methodology for causing graphical data to be presented to a developer of an application or operating system responsive to performing a computing operation on a spike.
Figure 6:
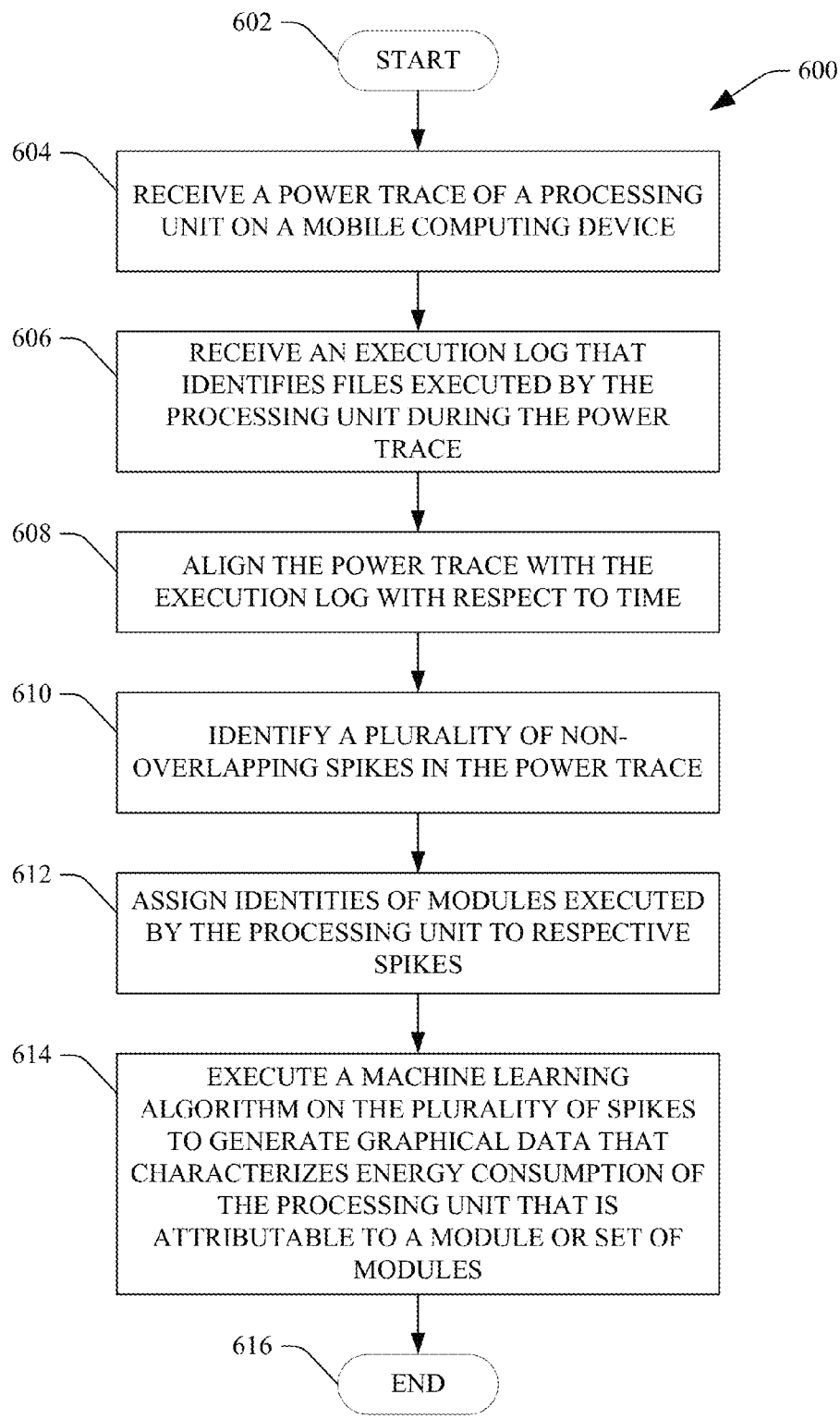
FIG. 6 is a flow diagram that illustrates an exemplary methodology for utilizing machine learning techniques with respect to a plurality of spikes to generate graphical data that characterizes energy consumption of a processing unit that is attributable to a module or set of modules executed by the processing unit.

With reference now to FIGS. 5-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring now to FIG. 5, an exemplary methodology 500 that facilitates the output of graphical data pertaining to electric power consumption of a processing unit that is attributable to a certain module is illustrated. The methodology 500 starts at 502, and at 504 a spike is retrieved from a data repository on a computing device. As described above, a spike is a collection of time-series data over a defined window of time and comprises an amount of electric power utilized by a processing unit in a mobile computing device with a particular hardware configuration at a plurality of time intervals in the window of time, as well as identities of modules executed by the processing unit in the mobile computing device within the defined window of time. The aforementioned data repository may include a plurality of spikes which have been extracted from a power trace.

At 506, at least one computing operation is performed on the spike. For instance, the computing operation may be a clustering operation that clusters spikes in the data repository into a plurality of different clusters. In another example, the at least one computing operation may be a linear regression operation that facilitates computing estimates of energy consumed by the processing unit when executing modules identified in the spike. In still yet another example, the computing operation may be learning a decision tree that is indicative of energy consumed by the processing unit that is attributable to various modules.

At 508, graphical data is automatically caused to be presented to a developer of an application or operating system responsive to performing the at least one computing operation on the spike. For instance, the graphical data can be indicative of power caused to be consumed by the processing unit when executing the at least one module. In another example, the graphical data can be a graphical depiction of clusters set forth to the developer to indicate characteristic power shape patterns corresponding to modules or sets of modules.

Now referring to FIG. 6, an exemplary methodology 600 that facilitates generating graphical data that is indicative of an amount of energy consumed by a processing unit that is attributable to a particular executable module is illustrated. The methodology 600 starts at 602, and at 604 a power trace of a processing unit in a mobile computing device is received. As described above, the power trace comprises sampled energy consumption by the processing unit over a first window of time.

At 606, an execution log that identifies modules executed by the processing unit during the power trace (during the first window of time) is received. At 608, the power trace is aligned with the execution log with respect to time.

At 610, a plurality of non-overlapping spikes are identified in the power trace. The spike comprise energy consumed by the processing unit over sampling intervals, wherein the spike is confined to a second window of time that is less than the first window of time. At 612, identities of modules executed by the processing unit during respective spikes are assigned to spikes based at least in part upon the aligning of the power trace with the execution log. At 614, one of a supervised machine learning algorithm or an unsupervised machine learning algorithm is executed on the plurality of spikes to generate graphical data that indicates to a developer a characterization of electric power consumption that can be attributed to a module or set of modules identified in the at least one spike. The methodology 600 completes at 616.

Figure 7:
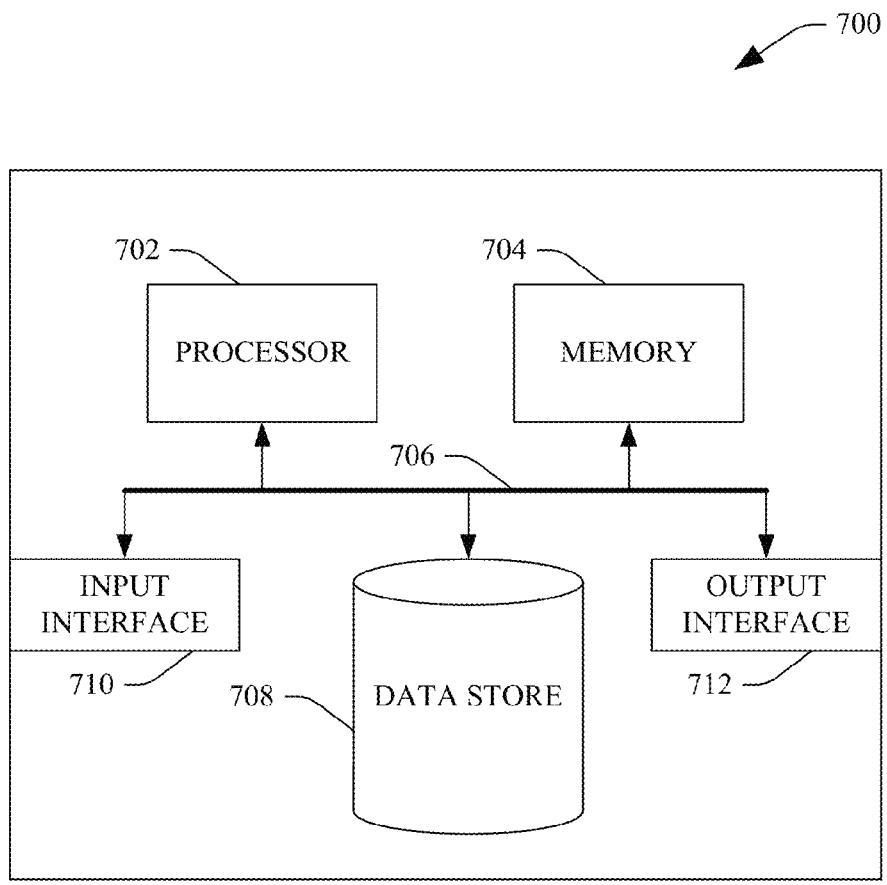
FIG. 7 is an exemplary computing system.

Now referring to FIG. 7, a high-level illustration of an exemplary computing device 700 that can be used in accordance with the systems and methodologies disclosed herein is illustrated. For instance, the computing device 700 may be used in a system that supports generating graphical data for presentment to a developer of an application or operating system. In another example, at least a portion of the computing device 700 may be used in a system that supports generating an execution log. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. In a mobile phone, for instance, the instructions executing on the processor 702 may cause other functionality on the phone to execute, such as GPS sensors, vibration, reading of accelerometers, or transmittal of data via a wireless or cellular connection. The processor 702 may access the memory 704 by way of a system bus 706. In addition to storing executable instructions, the memory 704 may also store clusters, power traces, execution logs, etc.

The computing device 700 additionally includes a data store 708 that is accessible by the processor 702 by way of the system bus 706. The data store may be or include any suitable computer-readable storage, including a hard disk, memory, etc. The data store 708 may include executable instructions, execution logs, power traces, identified spikes, etc. The computing device 700 also includes an input interface 710 that allows external devices to communicate with the computing device 700. For instance, the input interface 710 may be used to receive instructions from an external computer device, a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a computing device, the method comprising:
   receiving a first estimate, the first estimate being an estimate of an amount of power consumed by a processor when the processor executes at least two modules concurrently;
   receiving a second estimate, the second estimate being an estimate of an amount of power consumed by the processor when the processor executes a first module in the at least two modules independently from a second module in the at least two modules;
   receiving a third estimate, the third estimate being an estimate of an amount of power consumed by the processor when the processor executes the second module independently from the first module;
   based upon the first estimate, the second estimate, and the third estimate, identifying that the least two modules, when the processor concurrently executes the at least two modules, cause the processor to consume an amount of energy that is larger than an aggregate of amounts of energies caused to be consumed by the processor when the processor executes the at least two modules separately; and
   presenting graphical data on a display that indicates that the processor is caused to consume more energy when the processor concurrently executes the at least two modules compared to when the processor executes the at least two modules separately.

2. The method of claim 1, the processor being a mobile device processor.

3. The method of claim 2, the mobile device being a telephone.

4. The method of claim 1, wherein identifying the at least two modules comprises:
   analyzing at least one power trace, the at least one power trace comprises amounts of energy consumed by the processor with respect to time over a window of time, wherein the at least two modules are identified based upon the amounts of energy consumed by the processor with respect to time over the window of time indicated in the at least one power trace.

5. The method of claim 4, wherein identifying the at least two modules comprises:
   analyzing an execution log, the execution log identifies modules executed by the processor with respect to time over the window of time, wherein the at least two modules are identified based upon amounts of power in the power trace at times when the execution log indicates that at least one of the at least two modules was executed by the processor.

6. The method of claim 1, wherein identifying the at least two modules comprises:
   accessing a spike that is retained in a data repository, the spike being time-series data over a defined window of time, the spike comprising:
      an amount of electric power utilized by the processor at a plurality of time intervals in the defined window of time; and
      identities of modules executed by the processor within the defined window of time; and
   performing at least one computing operation on the spike, wherein the at least two modules are identified based upon the performing of the at least one computing operation on the spike.

7. The method of claim 6, wherein the at least one computing operation is a clustering operation that clusters spikes retained in the data repository, the at least two modules identified based upon clustering of the spikes into several clusters.

8. The method of claim 7, wherein the clustering operation clusters spikes based upon at least one of:
   shape of the spikes;
   identities of modules assigned to the spikes;
   duration of the spikes; or
   average power consumption indicated in the spikes.

9. The method of claim 6, wherein the at least one computing operation comprises computing estimates of energy consumed by the processor when executing modules identified in the spike by way of regression analysis.

10. The method of claim 1, wherein the at least one computing operation comprises learning a decision tree that is indicative of energy consumed by the processor that is attributable to various modules.

11. The method of claim 10, wherein the decision tree comprises a plurality of nodes, wherein each node is assigned a value that is indicative of an average amount of energy consumed by the processing unit when subsets of modules assigned to nodes are considered.

12. The method of claim 1, the graphical data comprises a table that indicates amounts of energy consumed by the processor that are attributable to the at least two modules when executed separately by the processor and the amount of energy consumed by the processor that is attributable to the at least two modules when executed concurrently by the processor.

13. The method of claim 1, the at least two modules being modules of an operation system of a mobile computing device.

14. A system comprising:
   at least one processor; and
   memory that stores instructions that, when executed by the at least one processor, cause the at least one processor to perform acts comprising:
      receiving data that is indicative of:
         power consumed by a processor over a window of time; and
         identities of modules executed by the processor over the window of time; and
      based upon the data, generating an estimate of an amount of power consumed by the processor that is attributable to at least two modules in the modules when the processor executes the at least two modules concurrently; and based upon the estimate, outputting graphical data on a display that indicates that the at least two modules cause the processor to consume more power when the processor concurrently executes the at least two modules compared to aggregates of amounts of power when the processor executes the at least two modules separately.

15. The system of claim 14, the processor being for a mobile telephone.

16. The system of claim 15, the modules being for an operating system of the mobile telephone.

17. The system of claim 15, the data comprising a plurality of spikes, each spike confined to a different time window in the window of time, each spike comprising:

amounts of electric power consumed by the processor over sampling intervals in a time window of a spike; and identities of modules executed by the processor in the time window of the spike.

18. The system of claim 17, wherein generating the estimate comprises executing a pattern recognition algorithm over the plurality of spikes and identifying a pattern therein based upon the pattern recognition algorithm, the estimate is generated based upon the pattern.

19. A computer-readable storage device comprising instructions that, when executed by at least one processor, cause the at least one processor to perform acts comprising:

generating an estimate of an amount of power consumed by a processor that is attributable to at least two modules when the processor concurrently executes the at least two modules;

generating estimates of amounts of power consumed by the processor that are respectively attributable to each module in the at least two modules when the processor executes each module separately; and based upon the estimate and the estimates, identifying that the at least two modules cause the processor to consume more power when the processor concurrently executes the at least two modules compared to an aggregate of the amounts of power consumed by the processor when the processor executes each module separately.

20. The computer-readable storage device of claim 19, wherein identifying that the at least two modules cause the processor to consume more power when the processor concurrently executes the at least two modules compared to the aggregate of the amounts of power consumed by the processor when the processor executes each module separately comprises:

analyzing a power trace, the power trace comprises amounts of energy consumed by the processor with respect to time over a window of time, wherein the at least two modules are identified as causing the processor to consume more power when the processor concurrently executes the at least two modules compared to the aggregate of the amounts of power consumed by the processor when the processor executes each module separately based upon the amounts of energy consumed by the processor with respect to time over the window of time indicated in the power trace.

* * * * *